(12) United States Patent
Lowney

(10) Patent No.: US 12,321,005 B2
(45) Date of Patent: Jun. 3, 2025

(54) LIGHTGUIDE OUTCOUPLER AND METHODS FOR OUTCOUPLING LIGHT OF A LIGHTGUIDE

(71) Applicant: GOOGLE LLC, Mountain View, CA (US)

(72) Inventor: Joseph Daniel Lowney, Tucson, AZ (US)

(73) Assignee: GOOGLE LLC, Mountain View, CA (US)

( * ) Notice: Subject to any disclaimer, the term of this patent is extended or adjusted under 35 U.S.C. 154(b) by 174 days.

(21) Appl. No.: 18/075,512

(22) Filed: Dec. 6, 2022

(65) Prior Publication Data
US 2023/0236424 A1    Jul. 27, 2023

Related U.S. Application Data

(60) Provisional application No. 63/302,771, filed on Jan. 25, 2022.

(51) Int. Cl.
*F21V 8/00* (2006.01)
*G02B 27/01* (2006.01)

(52) U.S. Cl.
CPC ......... *G02B 6/0058* (2013.01); *G02B 6/0038* (2013.01); *G02B 27/0172* (2013.01); *G02B 2027/0123* (2013.01)

(58) Field of Classification Search
None
See application file for complete search history.

(56) References Cited

U.S. PATENT DOCUMENTS

| 10,168,531 | B1* | 1/2019 | Trail | G02B 27/0093 |
| 10,451,947 | B1* | 10/2019 | Lu | G06F 1/163 |
| 10,534,115 | B1* | 1/2020 | Calafiore | G02B 5/1857 |
| 10,935,730 | B1* | 3/2021 | Lou | G02B 27/0172 |
| 10,996,382 | B1* | 5/2021 | Calafiore | G03F 7/2022 |
| 2005/0122593 | A1 | 6/2005 | Johnson | |
| 2006/0221448 | A1* | 10/2006 | Nivon | G02B 6/0076 359/566 |
| 2010/0177388 | A1* | 7/2010 | Cohen | G02B 6/0038 359/566 |

(Continued)

FOREIGN PATENT DOCUMENTS

| DE | 19935631 C1 | 4/2001 |
| WO | 2021069918 A1 | 4/2021 |

*Primary Examiner* — Jerry Rahll

(57) ABSTRACT

The present disclosure provides techniques to reduce the appearance of an illuminated area on the world-side of lens of a head mounted display (HMD) caused by display light that is outcoupled away from a user. A perimeter region is added to surround a primary region of an outcoupler, where the primary region includes a primary grating structure with one or more grating features to direct display light to the field of view (FOV) area of the user of the HMD. The perimeter region includes a perimeter grating structure with a perimeter grating feature that changes across the width of the perimeter region. In this manner, the perimeter region provides a perimeter grating structure gradient that gradually reduces the intensity of outcoupled display light across the width of the perimeter region, thereby having the effect of "softening" the edges of the outcoupler to reduce its appearance to observers.

19 Claims, 7 Drawing Sheets

(56) References Cited

U.S. PATENT DOCUMENTS

| | | | |
|---|---|---|---|
| 2010/0277803 A1* | 11/2010 | Pockett | G03B 21/62 353/121 |
| 2011/0176218 A1* | 7/2011 | Noui | G02B 27/0081 385/37 |
| 2015/0260994 A1* | 9/2015 | Akutsu | G02B 27/0172 385/37 |
| 2017/0003504 A1 | 1/2017 | Vallius et al. | |
| 2017/0031171 A1* | 2/2017 | Vallius | G02B 5/1819 |
| 2017/0307887 A1* | 10/2017 | Stenberg | G02B 26/0808 |
| 2018/0348529 A1 | 12/2018 | Blum et al. | |
| 2020/0124865 A1* | 4/2020 | Meyer Timmerman Thijssen | G02B 5/1819 |
| 2020/0142120 A1* | 5/2020 | Meyer Timmerman Thijssen | G02B 6/0011 |
| 2020/0225482 A1* | 7/2020 | Bodiya | G02B 27/0172 |
| 2022/0197035 A1* | 6/2022 | Adema | G02B 5/1819 |

* cited by examiner

LIGHTGUIDE OUTCOUPLER AND METHODS FOR OUTCOUPLING LIGHT OF A LIGHTGUIDE

CROSS-REFERENCE TO RELATED APPLICATIONS

The present application claims priority to U.S. Patent Application Ser. No. 63/302,771 entitled "SYSTEMS AND METHODS TO REDUCE LIGHT OUTPUT ON WORLD-SIDE OF LIGHTGUIDE," and filed on Jan. 25, 2022, the entirety of which is incorporated by reference herein.

BACKGROUND

In the field of optics, an optical combiner is an optical apparatus that combines two light sources, for example, environmental light from outside of the optical combiner and light emitted from a micro-display that is directed to the optical combiner via a lightguide. Optical combiners are used in wearable heads up displays (WHUDs), sometimes referred to as head-mounted displays (HMDs) or near-eye displays, which allow a user to view computer-generated content (e.g., text, images, or video content) superimposed over a user's environment viewed through the HMD, creating what is known as augmented reality (AR) or mixed reality (MR).

In a conventional HMD, light beams from an image source are coupled into a light guide substrate, generally referred to as the lightguide, by an input optical coupling (i.e., an "incoupler") such as an in-coupling optical grating, which can be formed on a surface, or multiple surfaces, of the substrate or disposed within the substrate. Once the light beams have been coupled into the lightguide, the light beams are "guided" through the substrate, typically by multiple instances of total internal reflection (TIR), to then be directed out of the lightguide by an output optical coupling (i.e., an "outcoupler"), which can also take the form of an optical grating. The light beams ejected from the lightguide overlap at an eye relief distance from the lightguide forming an exit pupil within which a virtual image generated by the image source can be viewed by the user of the HMD.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
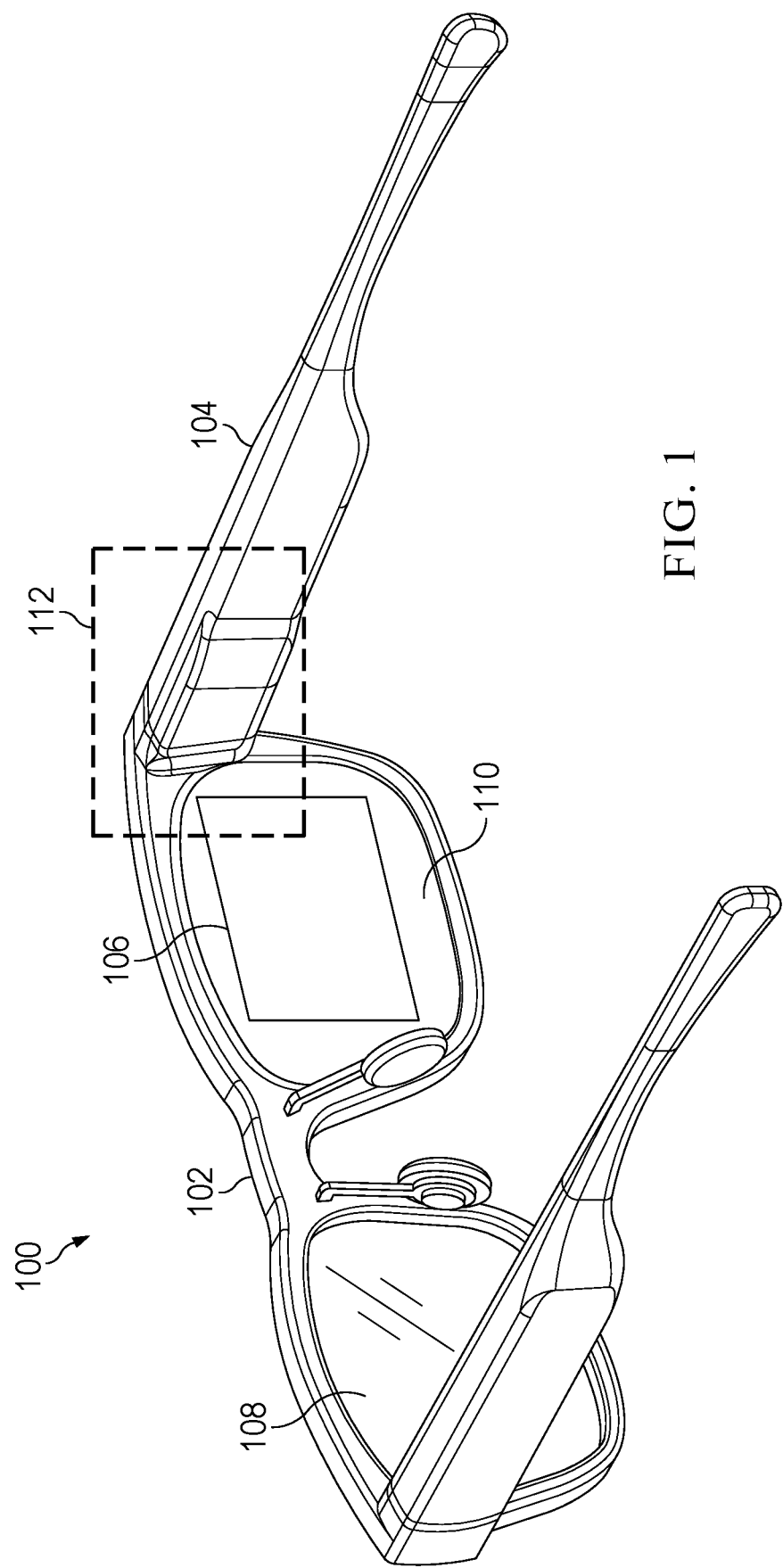
FIG. 1 shows an example display system having a support structure that houses a projection system configured to project images toward the eye of a user, in accordance with some embodiments.

Generally, in a lightguide-based HMD, the HMD directs display light emitted by a micro-display (also referred to as a "projector") toward the user's eye via an outcoupler of the lightguide. That is, the display light incoupled into the lightguide is directed out of the eye-side of the lightguide by the outcoupler. However, in some cases, a portion of the display light is outcoupled away from the user's eye towards the world-side, resulting in the illumination of an area on the world-side of the lightguide that is visible to an observer. For example, in a conventional HMD having an eyeglass form factor and employing a rectangular outcoupler, an observer might see a small, illuminated rectangle in the optical combiner (i.e., lens of the eyeglasses). The illuminated rectangle is often well defined with distinct edges corresponding to the shape of the outcoupler and can interfere with being able to see the user's eyes and be distracting to an observer, thus impacting user experience. FIGS. 1-9 illustrate techniques to reduce the world-side appearance of the illuminated area associated with the outcoupled display light by adding a perimeter region to the outcoupler to "soften" the appearance of the edges of the outcoupler, thereby making it less noticeable to observers.

Because the human eye is generally sensitive to "hard" (i.e., well-defined) edges and relatively high spatial frequencies of light, the modification of the edges of the outcoupler introduces a gradient that "softens" the edges of the illuminated area. This modification of the outcoupler is accomplished by adding a perimeter region to surround a primary region of the outcoupler (where the primary region includes a primary grating structure to direct display light to a field of view (FOV) area of the HMD and the perimeter region includes a perimeter grating structure) and performing one or more of the following: tapering the grating depth to zero at the outer boundary of the perimeter region, tapering or increasing a fill factor to 0% or to 100% at the outer boundary of the perimeter region, applying a feathering pattering structure in the perimeter region, and/or applying a dithering structure in the perimeter region. By adding the perimeter region and performing one or more of these techniques to its corresponding perimeter grating structure, the spatial frequencies that correspond to the human eye's peak sensitivity (e.g., according to the Barten Contrast Sensitivity Function) are suppressed, thereby reducing the appearance of the illuminated area corresponding to the outcoupler that is perceived by an observer. Additionally, the techniques of the present disclosure reduce the appearance of the outcoupler and/or exit pupil expander (i.e., reduce the visibility of the visual artifact the structures generate) that is perceived by the observer when the projector of the HMD is not emitting display light by "softening" the contrast of the edges of the outcoupler and/or exit pupil expander to reduce their corresponding visual artifacts due to reflected ambient light.

To illustrate, in some embodiments, an outcoupler of a lightguide includes a primary display region and a perimeter region. The primary display region includes a primary grating structure such as a diffractive or holographic grating structure that directs display light in the FOV area of an HMD. Thus, the primary grating structure includes one or more grating features that are designed to direct the display light to form an image that is perceived by the user. One example of such a grating feature is a fill factor. Other grating features include, for example, a depth or height of the grating, thickness of the grating, grating spacing, grating angles, or, for holographic gratings, an amplitude modulation factor. The perimeter region surrounds the primary display region and expands the grating area of the outcoupler. The perimeter region includes a perimeter grating structure with a perimeter grating feature that corresponds to the grating feature for the primary grating in the primary region and changes across a width of the perimeter region to outcouple an incrementally lower intensity of display light across the width of the perimeter region. For example, if a grating feature for the primary grating structure in the primary region is a fill factor of 50%, the perimeter grating structure in the perimeter region can have a fill factor of 50% or near 50% at the boundary with the primary display region. The fill factor of the perimeter grating structure in the perimeter region incrementally changes across the width of the perimeter region toward the outer boundary of the perimeter region, e.g., incrementally decreases from 50% to 0%. Accordingly, the perimeter region provides an area that "softens" the edges of the area associated with the outcoupler to reduce the appearance of outcoupled display light on the world-side. And, because the perimeter region outcouples the display light to the user outside of the FOV area, the effect on the display is negligible to the user of the HMD.

FIGS. 1-9 illustrate systems and methods of adding a perimeter region to an outcoupler or exit pupil expander in a lightguide. The perimeter region provides an area to implement a perimeter grating structure gradient for reducing the intensity of light that is observed on the world-side across the width of the perimeter region. This has the effect of eliminating the hard edges of the corresponding outcoupler or exit pupil expander to reduce their appearance as perceived by an observer. However, it will be appreciated that the apparatuses and techniques of the present disclosure are not limited to implementation in this particular display system, but instead may be implemented in any of a variety of display systems using the guidelines provided herein.

FIG. 1 illustrates an example head-mounted display (HMD) system 100 in accordance with some embodiments having support structure 102 that includes an arm 104, which houses a micro-display projection system configured to project images toward the eye of a user, such that the user perceives the projected images as being displayed in a field of view (FOV) area 106 of a display at one or both of lens elements 108, 110. In the depicted embodiment, the display system 100 includes a support structure 102, which is configured to be worn on the head of a user and has a general shape and appearance (i.e., "form factor") of an eyeglasses frame. The support structure 102 contains or otherwise includes various components to facilitate the projection of such images toward the eye of the user, such as a projector and a lightguide (shown in FIG. 2). In some embodiments, the support structure 102 further includes various sensors, such as one or more front-facing cameras, rear-facing cameras, other light sensors, motion sensors, accelerometers, and the like. The support structure 102 further can include one or more radio frequency (RF) interfaces or other wireless interfaces, such as a Bluetooth™ interface, a WiFi interface, and the like. Further, in some embodiments, the support structure 102 includes one or more batteries or other portable power sources for supplying power to the electrical components of the HMD 100. In some embodiments, some or all of these components of the HMD 100 are fully or partially contained within an inner volume of support structure 102, such as within the arm 104 in region 112 of the support structure 102. It should be noted that while an example form factor is depicted, it will be appreciated that in other embodiments the HMD 100 may have a different shape and appearance from the eyeglasses frame depicted in FIG. 1.

One or both of the lens elements 108, 110 are used by the HMD 100 to provide an augmented reality (AR) or mixed reality (MR) display in which rendered graphical content can be superimposed over or otherwise provided in conjunction with a real-world view as perceived by the user through the lens elements 108, 110. For example, light used to form a perceptible image or series of images may be projected by the micro-display of the HMD 100 onto the eye of the user via a series of optical elements, such as a lightguide formed at least partially in the corresponding lens element, one or more scan mirrors, and one or more optical relays, and/or one or more prisms. One or both of the lens elements 108, 110 thus include at least a portion of a lightguide that routes display light received by an incoupler of the lightguide to an outcoupler of the lightguide, which outputs the display light toward an eye of a user of the HMD 100. The display light is modulated and projected onto the eye of the user such that the user perceives the display light as an image in FOV area 106. In addition, each of the lens elements 108, 110 is sufficiently transparent to allow a user to see through the lens elements to provide a field of view of the user's real-world environment such that the image appears superimposed over at least a portion of the real-world environment.

In some embodiments, the projector is a digital light processing-based projector, a scanning laser projector, or any combination of a modulative light source such as a laser or one or more light-emitting diodes (LEDs) or organic light-emitting diodes (OLEDs). In some embodiments, the projector includes multiple laser diodes (e.g., a red laser diode, a green laser diode, and/or a blue laser diode) and at least one scan mirror (e.g., two one-dimensional scan mirrors, which may be micro-electromechanical system (MEMS)-based or piezo-based). The projector is communicatively coupled to the controller (not shown) and a non-transitory processor-readable storage medium or memory storing processor-executable instructions and other data that, when executed by the controller, cause the controller to control the operation of the projector. In some embodiments, the controller controls a scan area size and scan area location for the projector and is communicatively coupled to a processor (not shown) that generates content to be displayed at the display system 100. The projector scans light over a variable area, designated the FOV area 106, of the display system 100. The scan area size corresponds to the size of the FOV area 106, and the scan area location corresponds to a region of one of the lens elements 108, 110 at which the FOV area 106 is visible to the user. Generally, it is desirable for a display to have a wide FOV area 106 to accommodate the outcoupling of light across a wide range of angles.

In some embodiments, the outcoupler includes a primary display region and a perimeter region surrounding the primary display region. The primary display region includes a primary grating with one or more grating features that are tuned to direct light to an eyebox of the HMD 100 to display an image or series of images across the FOV area 106. The perimeter region surrounds the primary display region and includes a perimeter grating with one or more perimeter grating features that change across a width of the perimeter region from a side of the perimeter region abutting the primary region to an outer boundary of the perimeter region. This change in the one or more perimeter grating features of the perimeter grating in the perimeter region provides a gradient for reducing the intensity of outcoupled light in the perimeter region as observed by an observer. In this manner, the perimeter region "gradually smooths" out the outcoupling of light over a wider area to make it less noticeable on the world-side.

Figure 2:
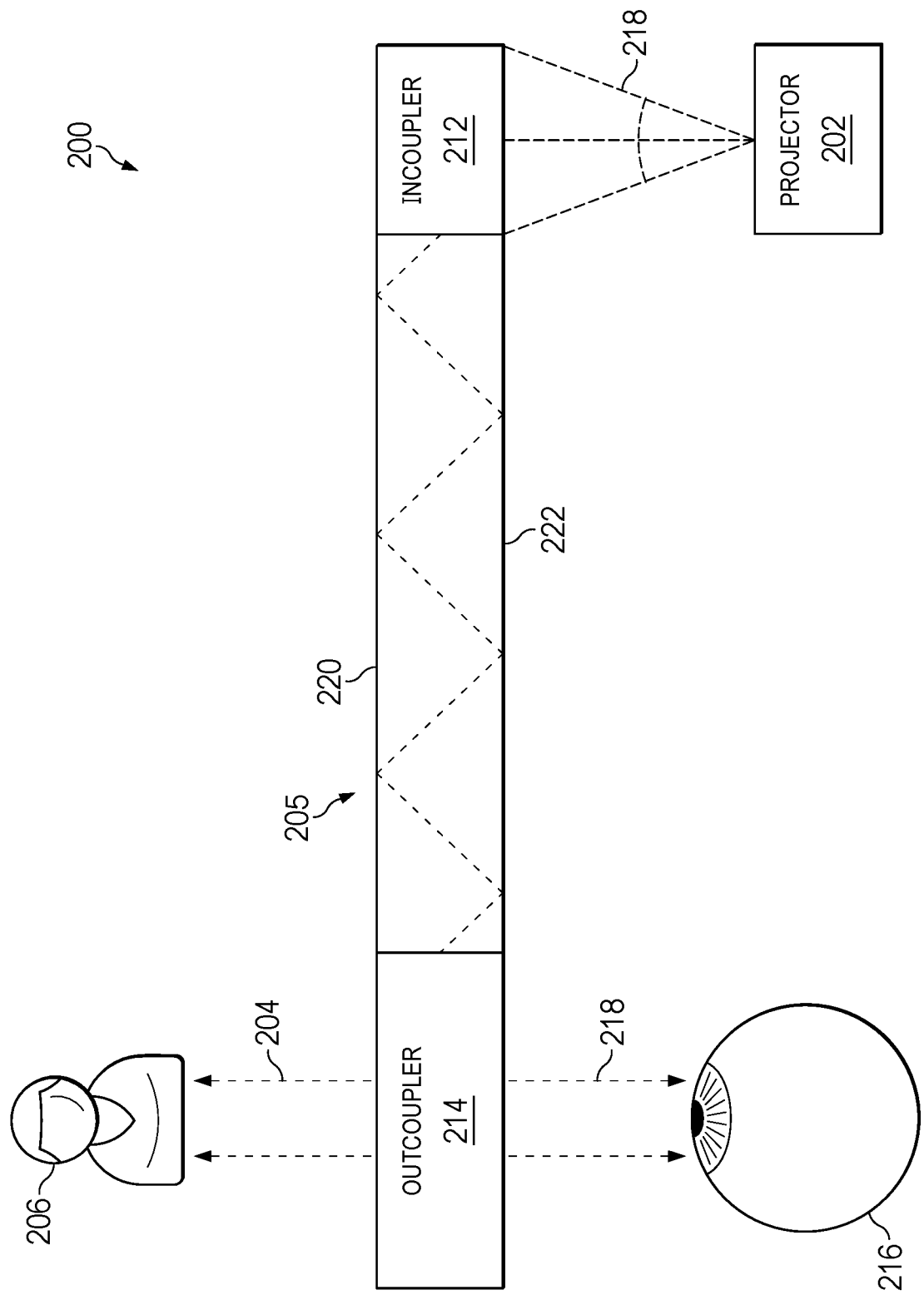
FIG. 2 shows an example of a block diagram of a projection system that projects light representing images onto the eye of a user via a display system, such as the display system of FIG. 1, in accordance with some embodiments.

FIG. 2 illustrates a simplified block diagram of a projection system 200 that projects images directly onto the eye 216 of a user via a lightguide 205. The projection system 200 includes a projector 202 and a lightguide 205 having an incoupler 212 and outcoupler 214, with the outcoupler 214 being optically aligned with an eye 216 of a user in the present example. For example, the outcoupler 214 substantially overlaps with the FOV area 106 shown in FIG. 1. In some embodiments, the projection system 200 is implemented in a wearable heads-up display or other display system, such as the HMD system 100 of FIG. 1.

The projector 202 includes one or more light sources configured to generate and output display light 218 (e.g., visible light such as red, blue, and green light and, in some embodiments, non-visible light such as infrared light). In some embodiments, the projector 202 is coupled to a driver or other controller (not shown), which controls the timing of emission of display light from the light sources of the projector 202 in accordance with instructions received by the controller or driver from a computer processor coupled thereto to modulate the display light 218 to be perceived as images when output to the retina of an eye 216 of a user.

For example, during operation of the projection system 200, display light 218 beams are output by the light source(s) of the projector 202 and then directed into the lightguide 205 before being directed to the eye 216 of the user. The lightguide 205 of the projection system 200 includes the incoupler 212 and the outcoupler 214. The term "lightguide," as used herein, will be understood to mean a combiner using one or more of total internal reflection (TIR), specialized filters, or reflective surfaces, to transfer light from an incoupler (such as the incoupler 212) to an outcoupler (such as the outcoupler 214). The lightguide 205 further includes two major surfaces 220 and 222, with major surface 220 being world-side (i.e., the surface farthest from the user) and major surface 222 being eye-side (i.e., the surface closest to the user). In some embodiments, the lightguide 205 is between a world-side lens and an eye-side lens, which form lens elements 108, 110 shown in FIG. 1, for example. In some embodiments, incoupler 212 and outcoupler 214 are located, at least partially, at major surface 220. In another embodiment, incoupler 212 and outcoupler 214 are located, at least partially, at major surface 222. In further embodiments, incoupler 212 is located at one of the major surfaces, while outcoupler 214 is located at the other of the major surfaces.

In some display applications, the light is a collimated image, and the lightguide 205 transfers and replicates the collimated image to the eye. In general, the terms "incoupler" and "outcoupler" will be understood to refer to any type of optical grating structure, including, but not limited to, diffraction gratings, holograms, holographic optical elements (e.g., optical elements using one or more holograms), volume diffraction gratings, volume holograms, surface relief diffraction gratings, or surface relief holograms. In some embodiments, a given incoupler or outcoupler is configured as a transmissive grating (e.g., a transmissive diffraction grating or a transmissive holographic grating) that causes the incoupler or outcoupler to transmit light and to apply designed optical function(s) to the light during the transmission. In some embodiments, a given incoupler or outcoupler is a reflective grating (e.g., a reflective diffraction grating or a reflective holographic grating) that causes the incoupler or outcoupler to reflect light and to apply designed optical function(s) to the light during the reflection. In the present example, the light 218 received at the incoupler 212 is relayed to the outcoupler 214 via the lightguide 205 using TIR. A first portion of the light 218 is then output to the eye 216 of a user via the outcoupler 214. However, a second portion of the light 204 is output at the world-side 220 of the outcoupler 214 where it can potentially be perceived by an observer 206 as an illuminated area having the shape and location of the outcoupler 214. As described above, in some embodiments the lightguide 205 is implemented in an optical combiner as part of an eyeglass lens, such as the lens element 108, 110 (FIG. 1) of the display system having an eyeglass form factor and employing projection system 200.

Although not shown in the example of FIG. 2, in some embodiments additional optical components are included in any of the optical paths between the projector 202 and the incoupler 212, between the incoupler 212 and the outcoupler 214, or between the outcoupler 214 and the eye 216 (e.g., in order to shape the light for viewing by the eye 216 of the user). In some embodiments, a prism (not shown) is used to steer light from the projector 202 into the incoupler 212 so that light is coupled into incoupler 212 at the appropriate angle(s) to encourage propagation of the light in lightguide 205 by TIR. Also, in some embodiments, an exit pupil expander, such as a fold grating, is arranged in an intermediate stage between incoupler 212 and outcoupler 214 to receive light that is coupled into lightguide 205 by the incoupler 212, expand the light, and redirect the light towards the outcoupler 214, where the outcoupler 214 then couples the light out of lightguide 205.

In some embodiments, the outcoupler 214 of the lightguide 205 includes a primary display region and a perimeter region surrounding the primary display region. The primary display region includes a primary grating with one or more grating features that are tuned to direct light to an eyebox of an HMD such as HMD 100 to display an image or series of images across a FOV area, such as FOV area 106 in FIG. 1. The perimeter region surrounds the primary display region and includes a perimeter grating with one or more perimeter grating features that change across a width of the perimeter region from a side of the perimeter region abutting the primary region to an outer boundary of the perimeter region. This change in the one or more perimeter grating features of the perimeter grating in the perimeter region provides a gradient for reducing the intensity of outcoupled light in the perimeter region as observed by an observer. Accordingly, the perimeter region "gradually smooths" out the outcoupling of light over a wider area to make it less noticeable on the world-side.

Figure 3:
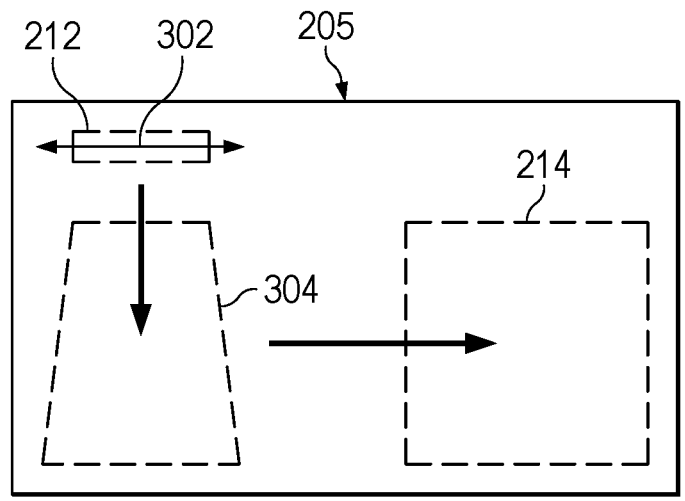
FIG. 3 shows an example of light propagation within a lightguide of a projection system, such as the projection system of FIG. 2, in accordance with some embodiments.

FIG. 3 shows an example of light propagation within the lightguide 205 of the projection system 200 of FIG. 2 in accordance with some embodiments. As shown, light received via the incoupler 212, which is scanned along the axis 302, is directed into an exit pupil expander (EPE) 304 and is then routed to the outcoupler 214 to be output (e.g., toward the eye of the user). In some embodiments, the exit pupil expander 304 expands one or more dimensions of the eyebox of the HMD that includes the projection system 200 (e.g., with respect to what the dimensions of the eyebox of the HMD would be without the exit pupil expander 304). In some embodiments, the incoupler 212 and the exit pupil expander 304 each include respective one-dimensional diffraction gratings (i.e., diffraction gratings that extend along one dimension). It should be understood that FIG. 3 shows a case in which the incoupler 212 directs light straight down (with respect to the presently illustrated view) in a first direction that is perpendicular to the scanning axis 302, and the exit pupil expander 304 directs light to the right (with respect to the presently illustrated view) in a second direction that is perpendicular to the first direction. While not shown in the present example, it should be understood that, in some embodiments, the first direction in which the incoupler 212 directs light is slightly or substantially diagonal, rather than exactly perpendicular, with respect to the scanning axis 302.

In some embodiments, the techniques described for the outcoupler (e.g., including a perimeter region) are also applied to the exit pupil expander. Accordingly, the appearance of the visual artifact that is generated by the outcoupler and the exit pupil expander on the world-side of the lens of an HMD is reduced. For example, even when the HMD is not emitting display light, the outcoupler and the exit pupil expander can still be visible to an observer due to the contrast between the reflection of ambient light off of them and the other regions of the lens. The addition of the perimeter region to at least one of the outcoupler and the exit pupil expander provides a gradient for reducing the intensity of this reflected light as observed by an observer, thereby reducing the world-side appearance of the outcoupler and/or the exit pupil expander since the well-defined boundaries (as perceived by the human eye) of these regions is eliminated.

Figure 4:
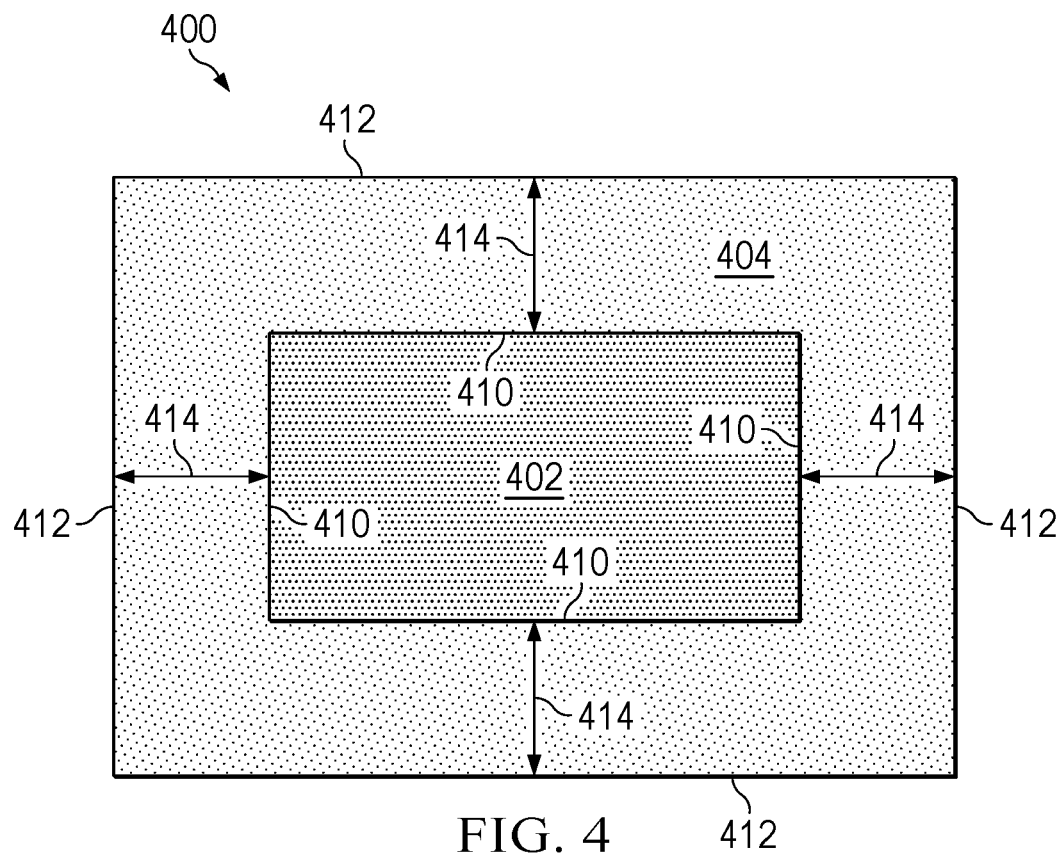
FIG. 4 shows an example of a grating structure area with a primary region and a perimeter region surrounding the primary region, in accordance with some embodiments.

FIG. 4 shows a world-side view of a grating area 400 in accordance with some embodiments. The grating area 400 includes a primary region 402 and a perimeter region 404 and corresponds to the area occupied by a grating structure in a lightguide. In some embodiments, the grating area 400 corresponds to the outcoupler 214 in FIG. 2 or 3. The primary region 402 corresponds to the portion of the outcoupler 214 that outcouples display light to display an image in a FOV area of an HMD, e.g., the FOV area 106 of HMD 100 in FIG. 1. In some embodiments, while the ensuing description discusses the grating area 400 as being associated with an outcoupler, e.g., the outcoupler 214 in FIG. 2, it is appreciated these techniques can also be applied to an exit pupil expander, e.g., the exit pupil expander 304 in FIG. 3.

Figure 5:
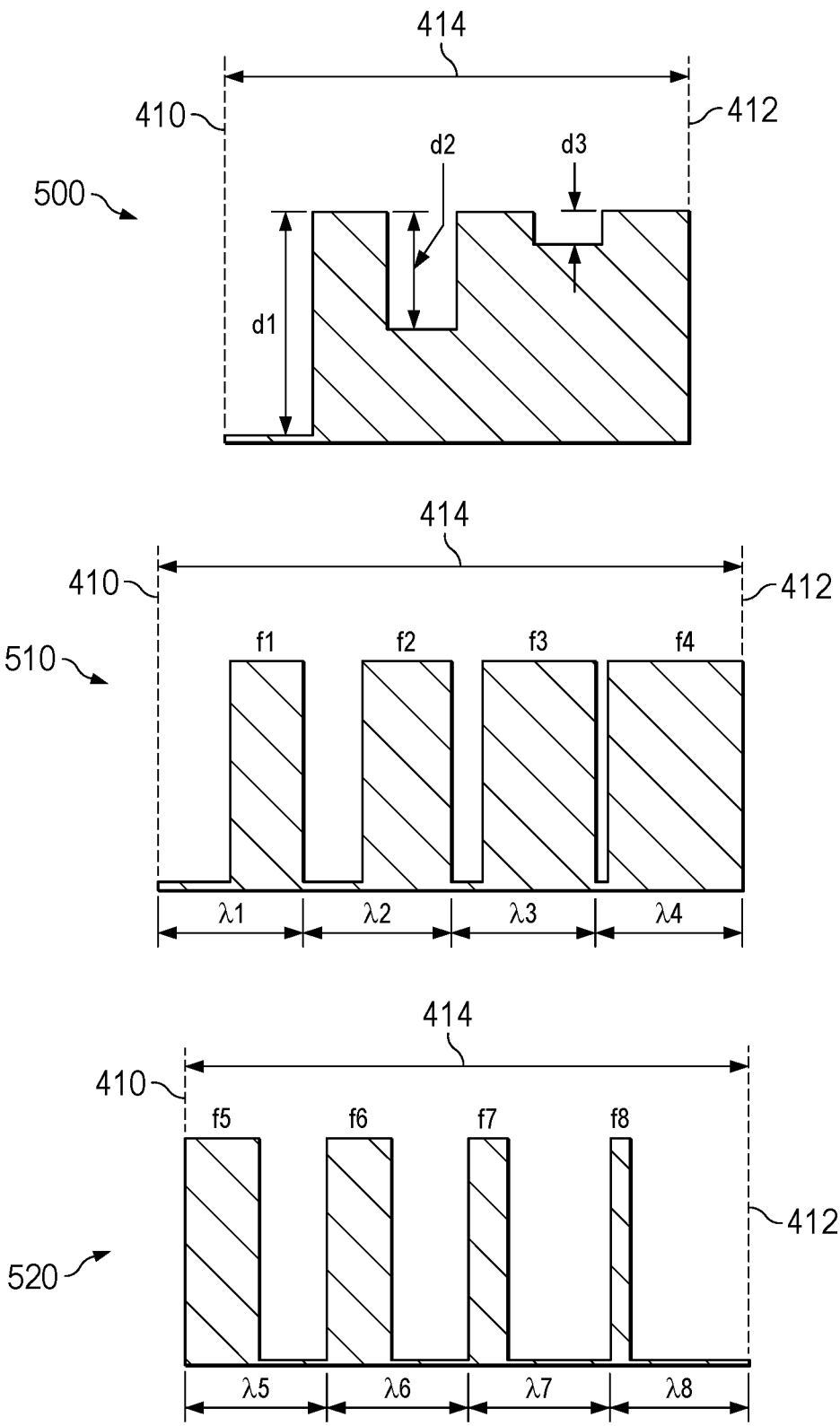
FIG. 5 shows examples of changing perimeter grating features in the perimeter region of FIG. 4, in accordance with some embodiments.

In some embodiments, the grating area 400 of the outcoupler includes a primary display region 402 and a perimeter region 404 surrounding the primary display region 402. The primary display region 402 includes a primary grating structure with one or more grating features that are tuned to outcouple display light and direct this light so that the user observes an image. For example, the primary display region 402 corresponds to the FOV area 106 described in FIG. 1. The grating features of the primary grating structure in the primary display region 402 include, for example, a fill factor (which is associated with a grating density and/or spacing) and a depth or height of the grating. Examples of these grating features are illustrated in FIG. 5 with respect to the perimeter region 404. The perimeter region 404 surrounds (i.e., frames) the primary display region 402 and includes sides 410 abutting the primary display region 402 and sides of an outer boundary 412. A width 414 of the perimeter region 404 spans from side 410 to outer boundary 412. In some embodiments, the perimeter region 404 includes a perimeter grating structure with grating features similar to those in the primary display region 402. However, the perimeter grating features of the perimeter grating structure in the perimeter region 402 change toward the outer boundary 412 of the perimeter region 404. In other words, the grating features of the perimeter grating structure in the perimeter region 404 are most similar to the grating features of the primary grating structure in the primary display region 402 at side 410, and as the distance to the primary display region 402 increases along width 414 toward outer boundary 412, these grating features become less pronounced to change the characteristics of the grating such that the intensity of outcoupled light is reduced. In this manner, the intensity of the light that is outcoupled is incrementally lowered (e.g., "smoothed out") across the width 414 of the perimeter region 404 so that the outer boundary of the outcoupler is not as well-defined as compared to a conventional outcoupler without the perimeter region 404.

In some embodiments, in the case of applying the perimeter region to an exit pupil expander, the primary region 402 is a primary expansion region and the perimeter region 404 is a perimeter expansion region.

FIG. 5 shows a series of cross-sectional view diagrams 500, 510, 520 illustrating a change in a perimeter grating feature of the perimeter grating structure in the perimeter region 404 to incrementally reduce the intensity of outcoupled light across the width of the perimeter region in accordance with some embodiments. The shaded areas in diagrams 500, 510, 520 indicate the areas of the perimeter region 404 filled with the grating material. In some embodiments, the grating material is a high-refractive index material such as Titanium Oxide, Silicon Nitride, another optical material such as a polymer resin having a refractive index between 1.3 and 2.1 (for example), or any combination thereof. In some embodiments, the bottom of diagrams 500-510, 520 corresponds to a major surface of a lightguide, e.g., one of major surfaces 220 or 222 of the lightguide 205 in FIG. 2.

In diagram 500, the perimeter grating depth is modulated over the width 414 of the perimeter region 404. That is, according to the embodiment illustrated in diagram 500, the grating feature that changes toward the outer boundary 412 of the perimeter region 404 is the perimeter grating depth. It is appreciated that while three perimeter grating depths (d1, d2, d3) are shown, this number is for conciseness and can be scaled to other quantities, e.g., more than three. In some embodiments, the perimeter grating depth ranges from 20 nm to 250 nm. In some embodiments, the perimeter grating depth (d1) closest to the side 410 abutting the primary region is substantially the same (e.g., within a margin of about 10%) or identical to the grating depth of the grating in the primary region 402. That is, the grating depth of the grating in the primary region is d1 or is substantially similar to d1. The perimeter grating depth decreases as it approaches the outer boundary 412 of the perimeter region 404. As shown, the second grating depth (d2) is less than the first grating depth (d1), and the third grating depth (d3) is less than the second grating depth (d2), i.e., d1>d2>d3. Accordingly, the perimeter region provides a gradient to incrementally reduce the outcoupling of light across the width 414 of the perimeter region 404 between the side 410 abutting the primary region and the outer boundary 412 of the perimeter region. This gradient reduces the appearance of the visual artifact caused by the outcoupling of light to the world-side as observed by an observer.

In diagram 510, the fill factor across the width 414 of the perimeter region 404 is increased. The fill factor is the fraction of the grating period (where the grating periods are denoted by $\lambda n$ in FIG. 5, where n is an integer) that is filled with grating material and is illustrated by the shaded regions marked with fn in FIG. 5, where n is an integer. In other words, the fill factor denotes the ratio indicating the space occupied by the grating material compared to the space that is not occupied by the grating material. For example, a fill factor of 50% indicates that the grating period is 50% filled with grating material and 50% void of the grating material. It is appreciated that while four grating periods ($\lambda 1$, $\lambda 2$, $\lambda 3$, $\lambda 4$) are shown in diagram 510, this number is for conciseness and can be scaled to other quantities, e.g., less than or more than four. In some embodiments, the grating periods $\lambda 1$-$\lambda 4$ the same length. In some embodiments, the fill factor (f1) of the first grating period $\lambda 1$ closest to the side 410 abutting the primary region is substantially the same (e.g., within a margin of about 10%) or identical to the fill factor for the grating structure in the primary region 402. For example and for purposes of this explanation, if the fill factor in the primary region is 50%, then f1 is 50%±5%. The fill factor increases as it approaches the outer boundary 412 of the perimeter region 404. As shown, the fill factor (f2) of the second grating period $\lambda 2$ is greater than the fill factor (f1) of the first grating period $\lambda 1$, the fill factor (f3) of the third grating period $\lambda 3$ is greater than the fill factor (f2) of the second grating period $\lambda 2$, and the fill factor (f4) of the fourth grating period $\lambda 4$ is greater than the fill factor (f3) of the third grating period $\lambda 3$, i.e., f1<f2<f3<f4. For example, f1=50%, f2=65%, f3=82.5%, and f4=95%. Accordingly, the perimeter region provides a gradient to incrementally reduce the outcoupling of light across the width 414 of the perimeter region 404 between the side 410 abutting the primary region and the outer boundary 412 of the perimeter region. This gradient reduces the appearance of the visual artifact caused by the outcoupling of light to the world-side as observed by an observer.

In diagram 520, the fill factor across the width 414 of the perimeter region 404 is reduced. That is, similar to the embodiment illustrated in diagram 510, the grating feature that changes toward the outer boundary 412 of the perimeter region 404 is the fill factor, but in this scenario, the fill factor decreases. It is appreciated that while four grating periods ($\lambda 5$-$\lambda 8$) are shown in diagram 520, this number is for conciseness and can be scaled to other quantities, e.g., less than or more than four. In some embodiments, the grating periods $\lambda 5$-$\lambda 8$ have the same length. In some embodiments, the fill factor (f5) of the first grating period $\lambda 5$ closest to the side 410 abutting the primary region is substantially the same (e.g., within a margin of about 10%) or identical to the fill factor for the grating structure in the primary region 402. For example and for purposes of this explanation, if the fill factor in the primary region is 50%, then f5 is 50%±5%. The fill factor decreases as it approaches the outer boundary 412 of the perimeter region 404. As shown, the fill factor (f6) of the second grating period $\lambda 6$ is less than the fill factor (f5) of the first grating period $\lambda 5$, the fill factor (f7) of the third grating period $\lambda 7$ is less than the fill factor (f6) of the second grating period $\lambda 6$, and the fill factor (f8) of the fourth grating period $\lambda 8$ is less than the fill factor (f7) of the third grating period $\lambda 7$, i.e., f5>f6>f7>f>. For example, f5=50%, f6=35%, f7=20%, and f8=10%. Accordingly, the perimeter region provides a gradient to incrementally reduce the outcoupling of light across the width 414 of the perimeter region 404 between the side 410 abutting the primary region and the outer boundary 412 of the perimeter region. This gradient reduces the appearance of the visual artifact caused by the outcoupling of light to the world-side as observed by an observer.

In sum, FIG. 5 shows embodiments for reducing the appearance of a visual artifact associated with an outcoupler outcoupling light to the world-side by adding a perimeter region 404 to an outcoupler and changing a perimeter grating feature of the perimeter grating structure in the perimeter region 404. The efficiency of the outcoupling of light in the perimeter region 404 is ramped off by changing one or more perimeter grating features (e.g., depth or fill factor) in the perimeter grating structure across the width of the perimeter region 404. In some embodiments, this modification of the one or more perimeter grating features changes the characteristics of the perimeter grating in the perimeter region 404 such that the intensity of the outcoupled light is reduced across the width 414 of the perimeter region 404. In some embodiments, while discussed in the alternative above, the embodiments shown in FIG. 5 are implemented in combination with one another, e.g., both the depth and the fill factor change toward the outer boundary 412 of the perimeter region 404.

Figure 6:
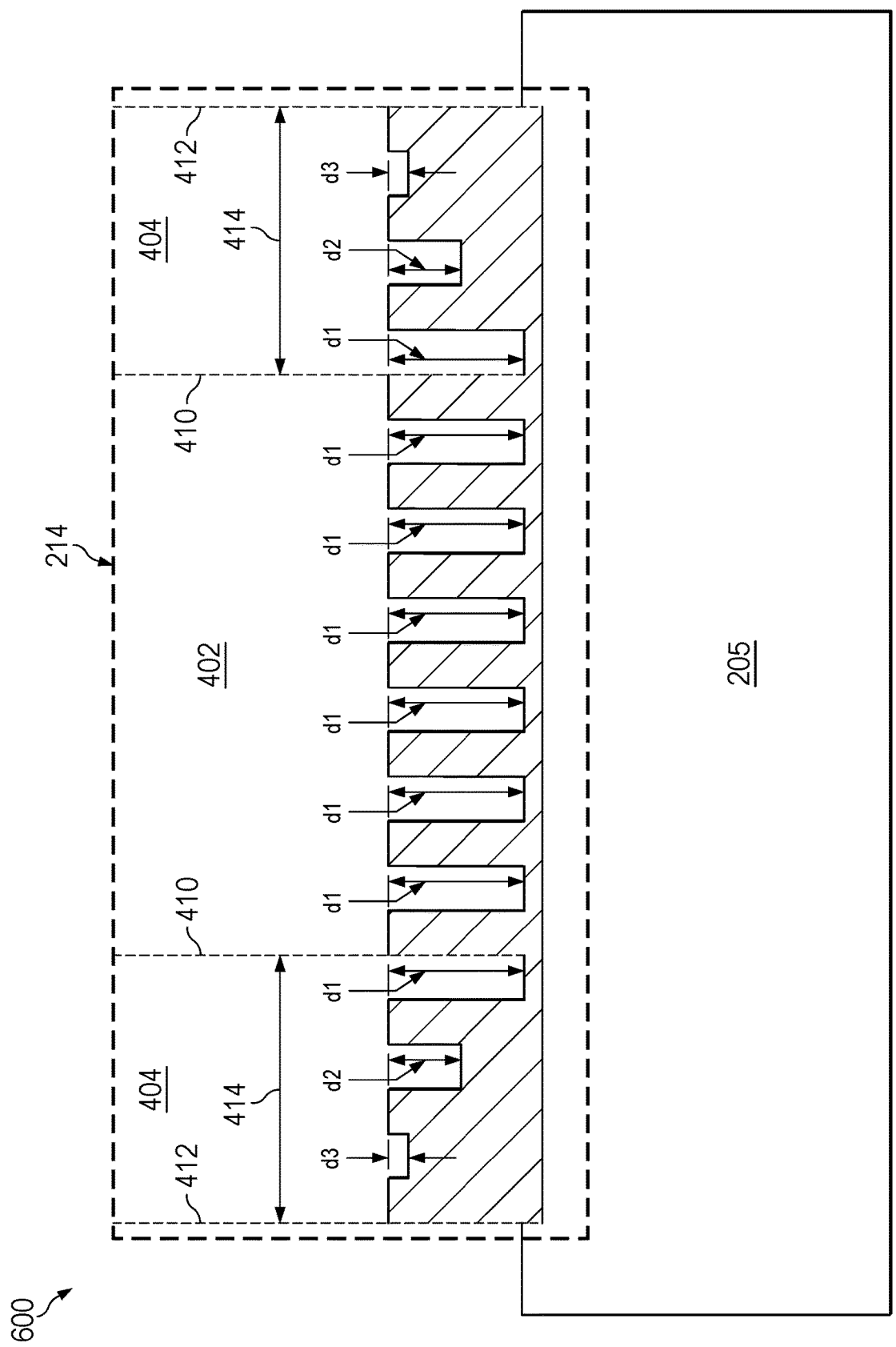
FIG. 6 shows an embodiment of a cross section of a grating structure area as shown in FIG. 4 on a lightguide, in accordance with some embodiments.

FIG. 6 shows a cross-sectional diagram 600 of a portion of a lightguide 205 with an outcoupler 214 in accordance with some embodiments. The outcoupler 214 is illustrated in accordance with the features described for the grating area shown in FIG. 4 in combination with the embodiment of the modulation of the grating depth shown in diagram 500 of FIG. 5. As shown, the perimeter grating depth (d1) of the perimeter grating structure in the perimeter region 404 closest to the sides 410 abutting the primary region 402 is the same or similar to the grating depth (d1) in the primary region 402. The depth of the perimeter grating structure in the perimeter region 404 changes (e.g., decreases from d1 to d3) across a width 414 of the perimeter region 404. Accordingly, this change in the perimeter grating feature changes the characteristics of the perimeter grating structure such that the intensity of light that is outcoupled across the width 414 of the perimeter region 404 is incrementally decreased, thereby reducing the appearance of the visual artifact associated with the outcoupler 214 to an observer on the world-side.

While the grating depth is shown as the perimeter grating feature of the perimeter grating structure that changes in FIG. 6, it is appreciated that a corresponding configuration is similarly envisioned for other perimeter grating features such as the fill factor embodiments described in diagrams 510 and 520.

Figure 7:
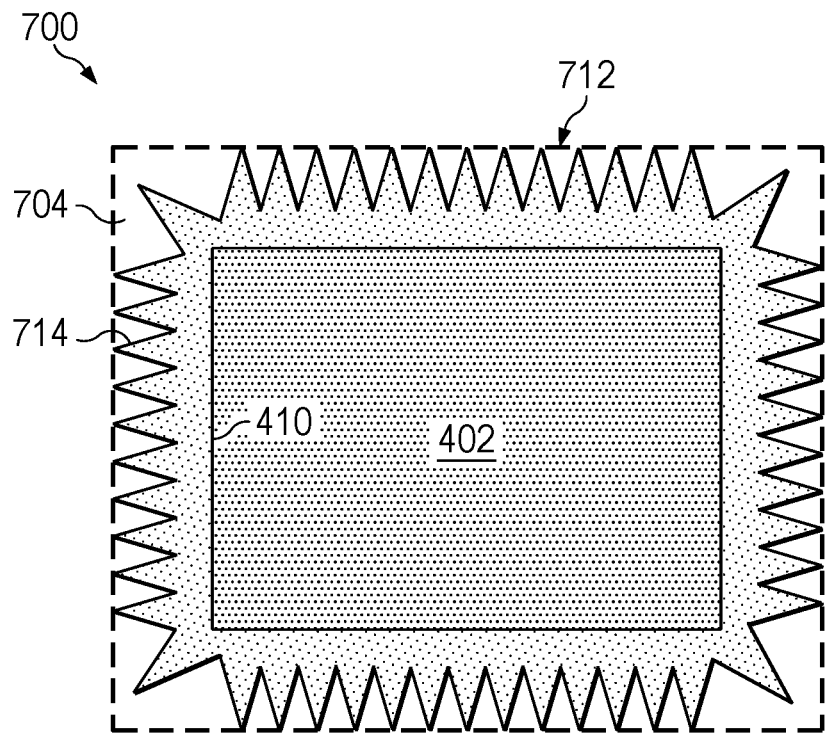
FIG. 7 shows an example of a perimeter region with a feathering structure including a plurality of extensions, in accordance with some embodiments.
Figure 8:
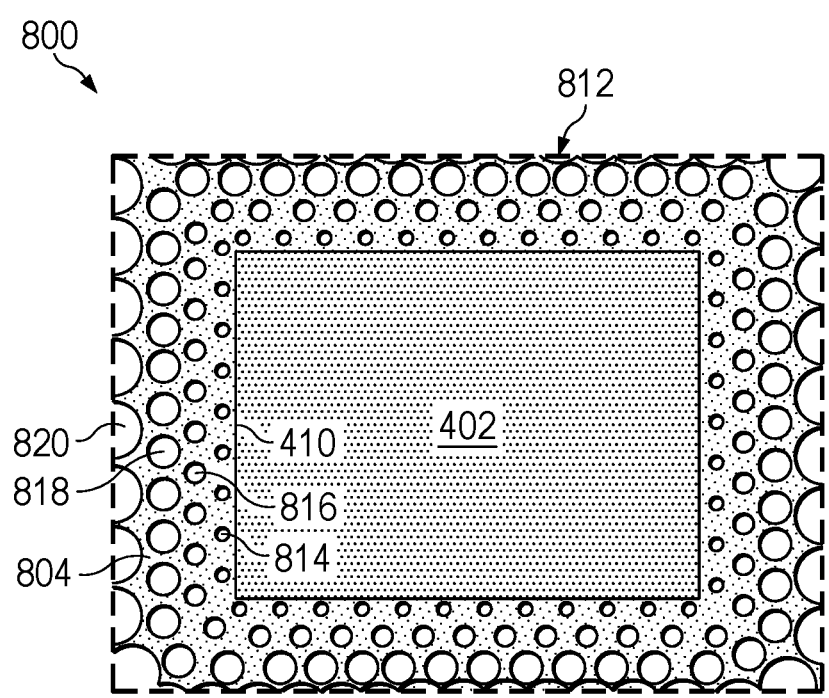
FIG. 8 shows an example of a perimeter region with a dithering structure, in accordance with some embodiments.

FIGS. 7 and 8 show a world-side view of an outcoupler illustrating additional embodiments for reducing the world-side appearance of a visual artifact associated with outcoupled or reflected light at an outcoupler by implementing a feathering structure (FIG. 7) or a dithering structure (FIG. 8). As illustrated, these structures incrementally reduce the amount of outcoupled light across the width of the perimeter region by reducing the area occupied by the perimeter grating in the perimeter region. These embodiments may be implemented in combination with the embodiments illustrated above in FIGS. 5 and 6 or may be implemented independently. In FIGS. 7 and 8, the shaded areas in the corresponding perimeter regions 704, 804 indicate the areas of the perimeter region with the perimeter grating.

In FIG. 7, a feathering structure is applied as the perimeter grating structure in the perimeter region 704 surrounding the primary region 402. For example, when applied to an outcoupler such as outcoupler 205, the area of the outcoupler is increased to include the feathering structure in the perimeter region 704 defined as the area between each of the sides 410 (one shown for clarity) abutting the primary display region 402 and the outer boundary indicated by dashed line 712. The feathering structure includes a plurality of extensions 714 (one shown for clarity) extending outward from a side 410 with the primary region 402. In some embodiments, the plurality of extensions is jagged or tooth-like in shape. In some embodiments, the perimeter grating features (e.g., grating depth and/or fill factor) in the feathering structure is substantially the same or identical to the primary grating features of the primary grating in the primary region 402. In this scenario, the perimeter grating feature that changes across the width of the perimeter region 704 toward the outer boundary 712 is the area occupied by the perimeter grating. As shown in FIG. 7, each of the plurality of extensions 714 occupy a smaller area toward the outer boundary 712 of the perimeter region 704.

The appearance of the boundaries of the outcoupler with the feathering structure in the perimeter region 704 is reduced due to multiple factors. First, the area occupied by the perimeter grating (i.e., shaded area in perimeter region 704) in the perimeter region 704 decreases from the side 410 with the primary region 402 to the outer boundary 712 of the perimeter region. Accordingly, the amount of the outcoupled display light gradually decreases as well. Second, due to the non-linearity of the feathering structure in the perimeter region 704, the appearance of the "hard-edge" of the outcoupler (e.g., compared to the conventional case in which the perimeter region 704 is not implemented and the outcoupler only includes the primary region 402) is eliminated, which reduces the visual artifact caused by the outcoupling of light to the world-side that is observable by an observer.

In FIG. 8, a dithering structure is applied as the perimeter grating structure in the perimeter region 804 surrounding the primary region 402. For example, when applied to an outcoupler such as outcoupler 205, the area of the outcoupler is increased to include the dithering structure in the perimeter region 804 defined as the area between each of the sides 410 (one shown for clarity) abutting the primary display region 402 and the outer boundary indicated by dashed line 812. As seen, the grating area occupied by the perimeter grating structure (indicated by the shaded regions) in the perimeter region 804 decreases from the side 410 abutting the primary region to the outer boundary 812 of the perimeter region 804 because the dithering structure in the perimeter region 804 includes increasingly larger void regions or empty spaces (shown by circles or portions of circles 814, 816, 818, 820). That is, the amount of perimeter grating near the outer boundary 812 is less than the amount of perimeter grating near the side 410 of the primary region 402. In some embodiments, the perimeter grating features (e.g., grating depth and/or fill factor) is the same in both the perimeter grating in the dithering structure of the perimeter region 804 and in primary grating in the primary region 802, albeit the total area occupied by the grating depth and/or fill factor decreases in the dithering structure in the perimeter region 804 toward the outer boundary 812. In other words, in the embodiment shown in FIG. 8, the perimeter grating feature that changes toward the outer boundary 812 of the perimeter region is the area occupied by the perimeter grating. Therefore, the appearance of the "hard-edge" of the outcoupler is eliminated, which reduces the appearance of the visual artifact caused by the outcoupling of light to the world-side as observed by an observer.

Figure 9:
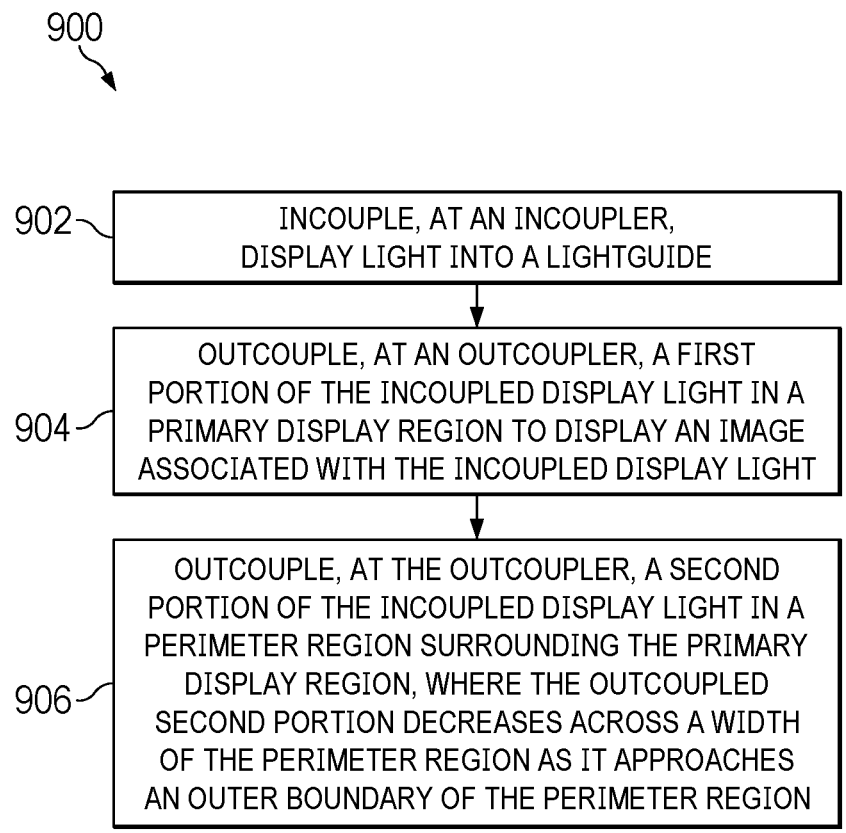
FIG. 9 shows a flowchart describing a method for controlling the outcoupling of display light in a lightguide, in accordance with some embodiments.

FIG. 9 shows a flowchart 900 illustrating a method to outcouple light in an HMD according to some embodiments. The method includes, in 902, incoupling, at an incoupler, display light into a lightguide of the HMD. In 904, the method includes outcoupling, at an outcoupler of the lightguide, a first portion of the display light in a primary display region to display an image associated with the display light. For example, the primary display region is associated with a FOV area of the HMD. Accordingly, the primary display region includes a primary grating with one or more primary grating features tuned to outcouple the display light to form an image to be observed by a user of the HMD. In 906, the method includes outcoupling, at the outcoupler, a second portion of the display light in a perimeter region surrounding the primary display region, wherein the outcoupled second portion of light decreases across a width of the perimeter region as it approaches an outer boundary of the perimeter region. In some embodiments, this second portion of light decreasing as it approaches the outer boundary of the perimeter region corresponds to a reduction in the intensity of light that is outcoupled across a width of the perimeter region. In other words, there is a gradual reduction in the brightness of light across the width of the perimeter region, where the highest brightness is at the boundary with the primary region and the lowest brightness is at the outer boundary of the perimeter region. While this outcoupled second portion of light may be negligible or not observable since it falls outside an eyebox associated with the HMD, the corresponding light that is outcoupled in the opposite direction (e.g., to the world-side) is modified to reduce the appearance of the visual artifact corresponding to the outcoupler that is observed by an observer.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A lightguide comprising:
an incoupler configured to incouple display light into the lightguide; and
an outcoupler configured to outcouple the display light out of the lightguide,
wherein the outcoupler comprises:
a primary display region with a grating feature, and
a perimeter region, surrounding the primary display region, with a perimeter grating feature corresponding to the grating feature that changes across a width of the perimeter region from a side of the perimeter region abutting the primary display region toward an outer boundary of the perimeter region,
wherein the perimeter region comprises:
on each side of one or more sides of the primary display region, a plurality of extensions extending outward from the primary display region, wherein the perimeter grating feature is a grating area, and wherein each of the plurality of extensions occupies a smaller grating area toward the outer boundary of the perimeter region than near the side of the perimeter region abutting the primary display region.

2. The lightguide of claim 1, wherein the perimeter grating feature is a grating depth that decreases toward the outer boundary of the perimeter region.

3. The lightguide of claim 1, wherein the perimeter grating feature is a fill factor that changes toward the outer boundary of the perimeter region.

4. The lightguide of claim 3, wherein the fill factor decreases to approach 0% toward the outer boundary of the perimeter region.

5. The lightguide of claim 3, wherein the fill factor increases to approach 100% toward the outer boundary of the perimeter region.

6. The lightguide of claim 1, wherein the plurality of extensions is saw-toothed.

7. The lightguide of claim 1, further comprising an exit pupil expander to transmit the incoupled display light from the incoupler to the outcoupler, wherein the exit pupil expander comprises a primary expansion region and a perimeter expansion region.

8. The lightguide of claim 7, wherein the primary expansion region comprises an expansion grating feature and the perimeter expansion region comprises a perimeter expansion grating feature, wherein the perimeter expansion grating feature changes from a side of the perimeter expansion region abutting the primary expansion region toward an outer boundary of the perimeter expansion region.

9. The lightguide of claim 8, wherein the perimeter expansion grating feature is a perimeter grating depth that decreases toward the outer boundary of the perimeter expansion region.

10. The lightguide of claim 8, wherein the perimeter expansion grating feature is a fill factor that increases to approach 100% toward the outer boundary of the perimeter expansion region.

11. The lightguide of claim 8, wherein the perimeter expansion grating feature is a fill factor that decreases to approach 0% toward the outer boundary of the perimeter expansion region.

12. The lightguide of claim 8, wherein the perimeter expansion region comprises, on one or more sides of the primary expansion region, a plurality of expansion extensions extending outward from the primary expansion region, wherein the perimeter expansion grating feature is a grating area, and wherein each of the plurality of expansion extensions occupies a smaller grating area toward the outer boundary of the perimeter expansion region than near the side of the perimeter expansion region abutting the primary expansion region.

13. The lightguide of claim 12, wherein the plurality of expansion extensions is saw-toothed.

14. The lightguide of claim 8, wherein the perimeter expansion region comprises, on one or more sides of the primary expansion region, an expansion dithering structure, wherein the perimeter expansion grating feature is an expansion grating area in the expansion dithering structure, and wherein the expansion grating area decreases toward the outer boundary of the perimeter expansion region.

15. A method comprising:
incoupling, at an incoupler, display light into a lightguide;
outcoupling, at an outcoupler, a first portion of the display light in a primary display region to display an image associated with the display light; and
outcoupling, at the outcoupler, a second portion of the display light in a perimeter region surrounding the primary display region, wherein the outcoupled second portion of display light decreases across a width of the perimeter region as it approaches an outer boundary of the perimeter region,
wherein the perimeter region comprises:
on each side of one or more sides of the primary display region, a plurality of extensions extending outward from the primary display region, wherein a perimeter grating feature is a grating area, and wherein each of the plurality of extensions occupies a smaller grating area toward the outer boundary of the perimeter region than near the side of the perimeter region abutting the primary display region, or
on one or more sides of the primary display region, a dithering structure, wherein a perimeter grating feature is a grating area in the dithering structure with a perimeter grating, and wherein the grating area decreases toward the outer boundary of the perimeter region.

16. The method of claim 15, wherein the primary display region comprises a primary grating with a primary grating feature to display the image, and the perimeter region comprises a perimeter grating with the perimeter grating feature that changes across the width of the perimeter region, wherein the perimeter grating feature changes characteristics of the perimeter grating such that an intensity of the outcoupled second portion of display light decreases across the width of the perimeter region.

17. The method of claim 16, wherein the perimeter grating feature is one or more of a grating depth, a fill factor, or a grating area.

18. A lightguide comprising:
an incoupler configured to incouple display light into the lightguide; and
an outcoupler configured to outcouple the display light out of the lightguide,
wherein the outcoupler comprises:
a primary display region with a grating feature, and
a perimeter region, surrounding the primary display region, with a perimeter grating feature corresponding to the grating feature that changes across a width of the perimeter region from a side of the perimeter region abutting the primary display region toward an outer boundary of the perimeter region,
wherein the perimeter region comprises:
on one or more sides of the primary display region, a dithering structure, wherein the perimeter grating feature is a grating area in the dithering structure with a perimeter grating, and wherein the grating area decreases toward the outer boundary of the perimeter region.

19. The lightguide of claim 18, wherein the dithering structure comprises void regions where the perimeter grating is not applied, wherein an area of the void regions increases toward the outer boundary of the perimeter region.

* * * * *